US012665296B2

(12) United States Patent
Tao et al.

(10) Patent No.: US 12,665,296 B2
(45) Date of Patent: Jun. 23, 2026

(54) ANTENNA, DETECTION APPARATUS, AND TERMINAL

(71) Applicant: Yinwang Intelligent Technologies Co., Ltd., Shenzhen (CN)

(72) Inventors: Jun Tao, Shenzhen (CN); Xiaopan Yang, Xi'an (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 20 days.

(21) Appl. No.: 18/522,931

(22) Filed: Nov. 29, 2023

(65) Prior Publication Data

US 2024/0097332 A1     Mar. 21, 2024

Related U.S. Application Data

(63) Continuation of application No. PCT/CN2021/097326, filed on May 31, 2021.

(51) Int. Cl.
| | |
|---|---|
| *H01Q 5/307* | (2015.01) |
| *H01Q 5/10* | (2015.01) |
| *H01Q 13/20* | (2006.01) |
| *H01Q 21/00* | (2006.01) |
| *G01S 13/931* | (2020.01) |
| *H01Q 1/32* | (2006.01) |

(52) U.S. Cl.
CPC ............... *H01Q 5/307* (2015.01); *H01Q 5/10* (2015.01); *H01Q 13/206* (2013.01); *H01Q 21/00* (2013.01); *G01S 13/931* (2013.01); *H01Q 1/3233* (2013.01)

(58) Field of Classification Search
CPC .... H01Q 1/3233; H01Q 5/307; H01Q 13/206; G01S 13/931
See application file for complete search history.

(56) References Cited

U.S. PATENT DOCUMENTS

| | | | |
|---|---|---|---|
| 4,521,781 A * | 6/1985 | Campi ................. | H01Q 13/206 |
| | | | 342/372 |
| 2010/0060541 A1 | 3/2010 | Jeng et al. | |
| 2011/0254746 A1* | 10/2011 | Park ...................... | H01Q 21/28 |
| | | | 333/236 |
| 2017/0023672 A1 | 1/2017 | Morrison | |
| 2021/0313676 A1 | 10/2021 | Zhang et al. | |
| 2022/0131278 A1* | 4/2022 | Sakurai ................ | H01Q 21/065 |

FOREIGN PATENT DOCUMENTS

| | | |
|---|---|---|
| CN | 103346391 A | 10/2013 |
| CN | 209804894 U | 12/2019 |
| CN | 111430925 A | 7/2020 |

(Continued)

*Primary Examiner* — Daniel Munoz
(74) *Attorney, Agent, or Firm* — Conley Rose, P.C.

(57) ABSTRACT

An antenna includes a convex structure and a concave structure that are formed on a side of a wide microstrip line in the antenna. A shape and a size of the convex structure and/or a shape and a size of the concave structure, a distance between convex structures, a distance between concave structures, and/or a distance between the convex structure and the concave structure are designed to enable the convex structure and the concave structure to resonate at different frequencies in order to support radiation of signals on different frequency bands.

20 Claims, 15 Drawing Sheets

(56)         References Cited

FOREIGN PATENT DOCUMENTS

| JP | S63140705 | U | 9/1988 |
| JP | H03235402 | A | 10/1991 |
| JP | 2001127523 | A | 5/2001 |
| JP | 2014003399 | A | 1/2014 |
| WO | 2020071316 | A1 | 4/2020 |

* cited by examiner

ANTENNA, DETECTION APPARATUS, AND TERMINAL

CROSS-REFERENCE TO RELATED APPLICATIONS

This application is a continuation application of International Patent Application No. PCT/CN2021/097326, filed on May 31, 2021, the disclosure of which is hereby incorporated by reference in its entirety.

TECHNICAL FIELD

This application relates to the field of radar technologies, and specifically, to an antenna, a detection apparatus, and a terminal.

BACKGROUND

A broadband technology is used in radars. A broadband radar has high range resolution, and the radar with high range resolution has a more accurate target recognition capability and can obtain a subtle feature of a complex target. Therefore, the broadband radar has a wide range of application in radar detection, imaging, target recognition, and the like.

With an increase of a communication frequency band, the broadband radar imposes an increasingly high requirement on an operating frequency band of an antenna. Therefore, how to design a broadband antenna with a low profile, a simple structure, and easy integration becomes an urgent problem to be resolved.

SUMMARY

Embodiments of this application provide a broadband antenna with a low profile, a simple structure, and easy integration. The antenna can be used in a detection apparatus or a terminal.

According to a first aspect, an antenna is provided. The antenna includes a metal floor, a dielectric substrate, and a microstrip radiation structure, and the metal floor and the microstrip radiation structure are respectively disposed on two sides of the dielectric substrate; and the microstrip radiation structure includes a first radiating element and a second radiating element, where the first radiating element is a radiating element formed by a convex structure on the microstrip radiation structure, the second radiating element is a radiating element formed by a concave structure on the microstrip radiation structure, the first radiating element supports a first frequency band, and the second radiating element supports a second frequency band.

It can be learned that the convex structure and the concave structure are formed on a side of a wide microstrip line. Shapes and sizes of the convex structure and the concave structure, a distance between the convex structures, a distance between the concave structures, and/or a distance between the convex structure and the concave structure are designed, to enable the convex structure and the concave structure to resonate at different frequencies. In this way, the convex structure and the concave structure support radiation of signals on different frequency bands. When the antenna operates, cavity-like field distribution can be implemented, so that broadband radiation of the antenna is implemented. For example, a line width of the microstrip line is greater than or equal to 0.425 times a center operating wavelength.

In some possible implementations, the microstrip radiation structure includes a plurality of first radiating elements; and/or the microstrip radiation structure includes a plurality of second radiating elements.

It can be learned that, in the antenna provided in this application, a quantity of first radiating elements and/or a quantity of second radiating elements may be flexibly designed as required, to implement a broadband antenna.

In some possible implementations, there is a second radiating element between at least one group of two adjacent first radiating elements in a first direction.

It can be learned that, in the antenna provided in this application, relative locations of the first radiating element and the second radiating element may be flexibly designed as required, to implement the broadband antenna.

In some possible implementations, there are at least two groups of adjacent first radiating elements in the plurality of first radiating elements, and a distance between centers of one group of two groups of adjacent first radiating elements is equal or unequal to a distance between centers of the other group of adjacent first radiating elements.

It can be learned that, in the antenna provided in this application, the distances between centers of adjacent first radiating elements may be flexibly designed as required, to implement the broadband antenna. When the distances between centers of adjacent first radiating elements are all equal, a design of the antenna can be simplified.

In some possible implementations, there are at least two groups of adjacent second radiating elements in the plurality of second radiating elements, and a distance between centers of one group of two groups of adjacent second radiating elements is equal or unequal to a distance between centers of the other group of adjacent second radiating elements.

It can be learned that, in the antenna provided in this application, the distances between centers of adjacent second radiating elements may be flexibly designed as required, to implement the broadband antenna. When the distances between centers of adjacent second radiating elements are all equal, the design of the antenna can be simplified.

In some possible implementations, the plurality of first radiating elements are disposed on a same side of the microstrip radiation structure; or a first part of radiating elements in the plurality of first radiating elements is disposed on a first side of the microstrip radiation structure, and a second part of radiating elements in the plurality of first radiating elements is disposed on a second side of the microstrip radiation structure, where the first side and the second side are two opposite sides of the microstrip radiation structure. When the first part of radiating elements in the plurality of first radiating elements is disposed on the first side of the microstrip radiation structure, and the second part of radiating elements in the plurality of first radiating elements is disposed on the second side of the microstrip radiation structure, the first radiating elements on the second side correspond to second radiating elements on the first side.

In some possible implementations, the plurality of second radiating elements may be all disposed on a same side of the microstrip radiation structure; or a first part of radiating elements in the plurality of second radiating elements is disposed on a first side of the microstrip radiation structure, and a second part of radiating elements in the plurality of second radiating elements is disposed on a second side of the microstrip radiation structure, where the first side and the second side are two opposite sides of the microstrip radiation structure. When the first part of radiating elements in the plurality of second radiating elements is disposed on the first side of the microstrip radiation structure, and the second part of radiating elements in the plurality of second radiating elements is disposed on the second side of the microstrip radiation structure, the second radiating elements on the second side correspond to first radiating elements on the first side.

It can be learned that, in the antenna provided in this application, the first radiating elements or the second radiating elements may be flexibly designed on two sides of the microstrip radiation structure as required, and locations of the first radiating elements on one side correspond to locations of the second radiating elements on the other side. Therefore, when the antenna operates, cavity-like field distribution can be implemented, and then the broadband antenna is implemented.

In some possible implementations, any two of the plurality of first radiating elements have a same shape; some of the plurality of first radiating elements have a same shape; or any two of the plurality of first radiating elements have different shapes.

In some possible implementations, any two of the plurality of second radiating elements have a same shape; some of the plurality of second radiating elements have a same shape; or any two of the plurality of second radiating elements have different shapes.

It can be learned that, in the antenna provided in this application, a shape of the first radiating element or a shape of the second radiating element may be flexibly designed as required, to implement the broadband antenna.

Optionally, the shape of the first radiating element is one of the following shapes or a shape formed by a combination of the following plurality of shapes: a sector, a semicircle, a circle, an oval, a triangle, a quadrilateral, or a polygon (a quantity of sides is greater than 4).

Optionally, the shape of the second radiating element is one of the following shapes or a shape formed by a combination of the following plurality of shapes: a sector, a semicircle, a circle, an oval, a triangle, a quadrilateral, or a polygon (a quantity of sides is greater than 4).

The quadrilateral includes any one of the following: a trapezoid, a parallelogram, or a non-parallelogram. The parallelogram includes any one of the following: a rectangle, a square, or a rhombus.

In some possible implementations, the microstrip radiation structure further includes an impedance matching structure, the impedance matching structure is disposed at a first end of the microstrip radiation structure, and the impedance matching structure is used to match impedance of the antenna.

It can be learned that the impedance matching structure is designed at a feed end of the microstrip radiation structure, so that a better feeding effect can be achieved for the antenna provided in this application. The impedance matching structure provided in this application may also be flexibly designed as required. For example, the impedance matching structure is a multi-stage impedance matching structure.

In some possible implementations, a second end of the microstrip radiation structure is an open circuit; or a second end of the microstrip radiation structure is a short circuit. When the second end (a non-feed end) of the microstrip radiation structure is a short circuit, the second end can be better grounded, so that radiation performance of the antenna is more stable.

In some possible implementations, a feeding manner of the antenna may be end feeding, side feeding, or back feeding.

It can be learned that the feeding manner may be flexibly selected for the antenna provided in this application.

In some possible implementations, a length of the first radiating element in a first direction is greater than or equal to 0.5 times a center operating wavelength of the antenna.

In some possible implementations, a distance between centers of the two adjacent first radiating elements in a first direction is greater than or equal to 0.65 times a center operating wavelength of the antenna.

In some possible implementations, a length of the first radiating element in a second direction is greater than or equal to 0.02 times the center operating wavelength of the antenna.

In some possible implementations, a length of the microstrip radiation structure in the second direction is less than or equal to 0.7 times the center operating wavelength of the antenna.

It can be learned that the required broadband antenna may be designed by optimizing and designing the structure parameters provided above.

According to a second aspect, an antenna array is provided. The antenna array includes the antenna according to any one of the first aspect or the possible implementations of the first aspect.

In some possible implementations, the antenna array includes a plurality of antennas and a power splitting and combining structure, and the plurality of antennas include a first antenna and a second antenna; the power splitting and combining structure includes a first power splitting end and a second power splitting end; and a first end of the first antenna is electrically connected to the first power splitting end of the power splitting and combining structure, and a first end of the second antenna is electrically connected to the second power splitting end of the power splitting and combining structure.

Therefore, a signal received on the first antenna and a signal received on the second antenna can be combined to a combining end. Alternatively, a signal transmitted by a combining end may be split to the first antenna and the second antenna. Therefore, a feed network can feed the antenna array in a one-drive-two manner.

Optionally, the power splitting and combining structure may alternatively be a one-to-multiple or multiple-in-one power splitting and combining structure, so that the feed network feeds the antenna array in a one-drive-multiple or a multiple-in-one manner.

In some possible implementations, the antenna array may further include a radome.

It can be learned that, in the antenna array including the antenna provided in this application, broadband radiation can be implemented.

According to a third aspect, a detection apparatus is provided. The detection apparatus includes the antenna according to any one of the first aspect or the possible implementations of the first aspect, and/or the detection apparatus includes the antenna array according to any one of the second aspect or the possible implementations of the second aspect.

In some possible implementations, the detection apparatus may be a radar.

It can be learned that the detection apparatus including the antenna and/or the antenna array provided in this application may have higher range resolution.

According to a fourth aspect, a terminal is provided. The terminal includes the detection apparatus according to the third aspect. Further, the terminal may be an intelligent transportation device, an intelligent manufacturing device, a smart home device, a surveying and mapping device, or the like.

In some possible implementations, the terminal is a vehicle.

It can be learned that the terminal or the vehicle including the detection apparatus provided in this application may have a higher sensing capability.

DESCRIPTION OF EMBODIMENTS

The following describes in detail embodiments of this application with reference to accompanying drawings.

This application is applicable to a wireless communication system, or is applicable to fields such as an advanced driving assistance system (ADAS), a robot, an unmanned aerial vehicle, a connected vehicle, and security surveillance. The ADAS may be, for example, autonomous driving.

This application is applicable to an autonomous driving vehicle or a vehicle integrated with the ADAS, for example, an autonomous driving vehicle with a human-machine interaction (HMI) function, or an autonomous driving vehicle that performs a motion control function on the vehicle. Optionally, the vehicle may include at least one autonomous driving system, to support autonomous driving of the autonomous driving vehicle.

Figure 1:
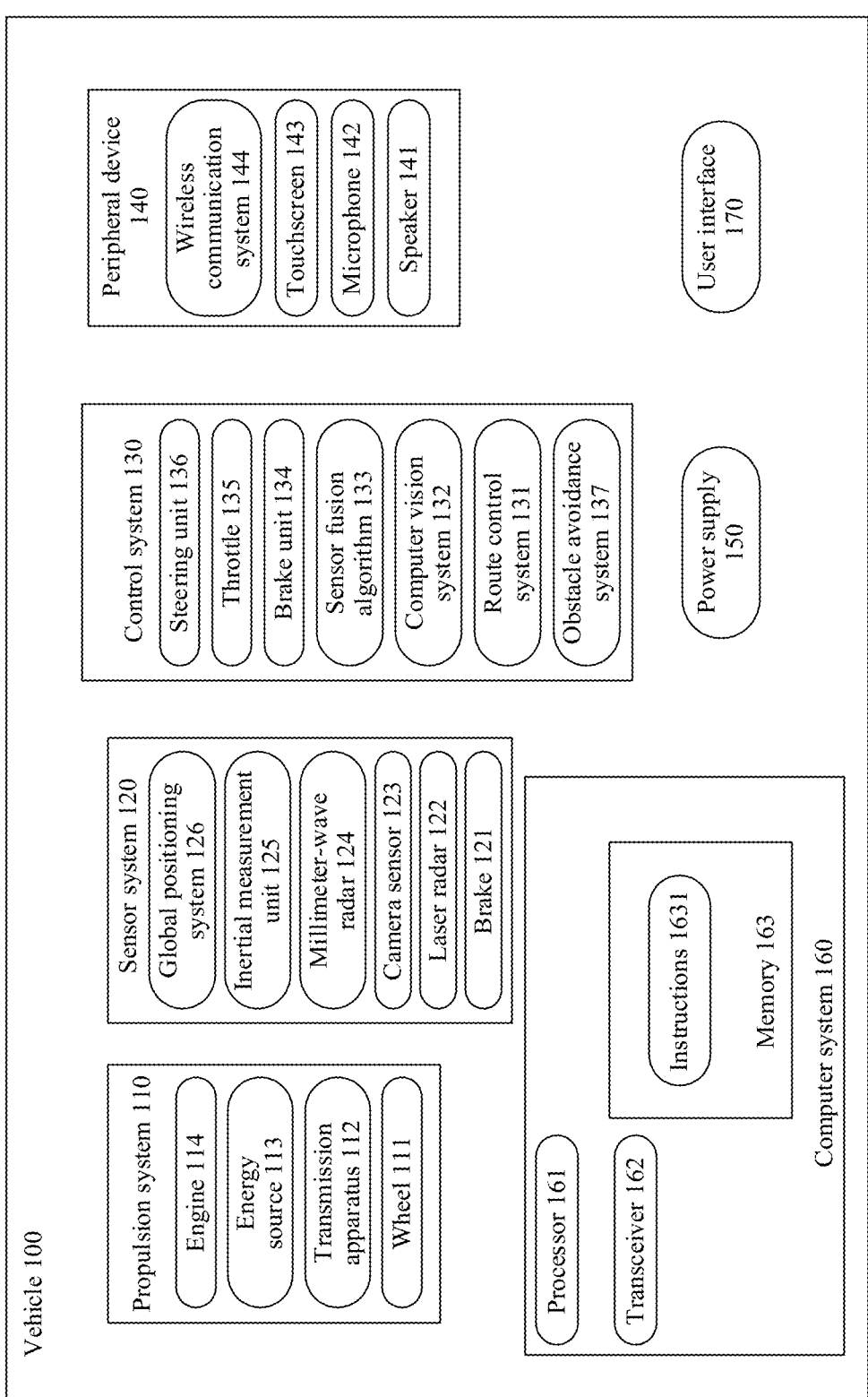
FIG. 1 is a schematic diagram of a structure of an application system according to an embodiment of this application.

FIG. 1 is a functional block diagram of a vehicle with an autonomous driving function according to an embodiment of this application. In an embodiment, a vehicle 100 is configured to be in a fully autonomous driving mode or a partially autonomous driving mode. As shown in FIG. 1, components coupled to the vehicle 100 or included in the vehicle 100 may include a propulsion system 110, a sensor system 120, a control system 130, a peripheral device 140, a power supply 150, a computer system 160, and a user interface 170. For example, the power supply 150 may supply power to all components of the vehicle 100. The computer system 160 may be configured to: receive data from the propulsion system 110, the sensor system 120, the control system 130, and the peripheral device 140, and control the propulsion system 110, the sensor system 120, the control system 130, and the peripheral device 140. The computer system 160 may be further configured to: generate and display an image on the user interface 170, and receive an input from the user interface 170.

It should be noted that, in another example, the vehicle 100 may include more, fewer, or different systems, and each system may include more, fewer, or different components. In addition, the shown systems and components may be combined or divided in any manner. This is not limited in this application.

The sensor system 120 may include several sensors configured to sense an ambient environment of the vehicle 100. As shown in FIG. 1, sensors in the sensor system 120 include a Global Positioning System (GPS) 126, an inertial measurement unit (IMU) 125, a laser radar 122, a camera sensor 123, a millimeter-wave radar 124, and a brake 121 that is configured to modify a location and/or an orientation of a sensor. The millimeter-wave radar 124 sensor may sense an object in the ambient environment of the vehicle 100 by using a radio signal. In some embodiments, in addition to sensing the target, the millimeter-wave radar 124 may be further configured to sense a speed and/or a moving direction of the target. The laser radar 122 may sense, by using a laser, an object in an environment in which the vehicle 100 is located. In some embodiments, the laser radar 122 may include one or more laser sources, laser scanners, one or more detectors, and another system component. The camera sensor 123 may be configured to capture a plurality of images in the ambient environment of the vehicle 100. The camera sensor 123 may be a static camera or a video camera.

The control system 130 controls operations of the vehicle 100 and components of the vehicle 100. The control system 130 may include various components, including a steering unit 136, a throttle 135, a brake unit 134, a sensor fusion algorithm 133, a computer vision system 132, a route control system 131, and an obstacle avoidance system 137. The steering unit 136 may be operated to adjust a moving direction of the vehicle 100. For example, in an embodiment, the steering unit 136 may be a steering wheel system. The throttle 135 is configured to: control an operating speed of an engine 114 and further control a speed of the vehicle 100. The control system 130 may additionally or alternatively include a component other than the components shown in FIG. 1. This is not limited in this application.

The computer vision system 132 may be operated to process and analyze an image captured by the camera sensor 123, to recognize a target and/or a feature in the ambient environment of the vehicle 100. The object and/or the feature may include a traffic signal, a road boundary, and an obstacle. The computer vision system 132 may use a target recognition algorithm, a structure from motion (SFM) algorithm, video tracking, and another computer vision technology. In some embodiments, the computer vision system 132 may be configured to: draw a map for an environment, track a target, estimate a speed of the target, and the like. The route control system 134 is configured to determine a driving route of the vehicle 100. In some embodiments, the route control system 131 may determine the driving route of the vehicle 100 in combination with data from the sensor system 120, the GPS 126, and one or more predetermined maps. The obstacle avoidance system 137 is configured to recognize, evaluate, and avoid or otherwise bypass a potential obstacle in the environment of the vehicle 100. In an example, the control system 130 may additionally or alternatively include a component other than those shown and described, or may delete some of the components shown above.

The peripheral device 140 may be configured to allow the vehicle 100 to interact with an external sensor, another vehicle, and/or a user. Therefore, the peripheral device 140 may include, for example, a wireless communication system 144, a touchscreen 143, a microphone 142, and/or a speaker 141. The peripheral device 140 may additionally or alternatively include a component other than the components shown in FIG. 1. This is not limited in this application.

The power supply 150 may be configured to supply power to some or all components of the vehicle 100. The components of the vehicle 100 may be configured to operate in a manner of interconnection with other components inside and/or outside respective systems. Therefore, the components and systems of the vehicle 100 may be communicatively linked together through a system bus, a network, and/or another connection mechanism.

Some or all of functions of the vehicle 100 are controlled by the computer system 160. The computer system 160 may include at least one processor 161. The processor 161 executes instructions 1631 stored in a non-transitory computer-readable medium, for example, a memory 163. The computer system 160 may alternatively be a plurality of computing devices that control an individual component or a subsystem of the vehicle 100 in a distributed manner.

The processor 161 may be any conventional processor, for example, a commercially available central processing unit (CPU). Alternatively, the processor may be a dedicated device, for example, an application-specific integrated circuit (ASIC) or another hardware-based processor. Although FIG. 1 functionally shows the processor, the memory, and other components of the computer system 160 in a same block, a person of ordinary skill in the art should understand that the processor, the computer, or the memory may actually include a plurality of processors, computers, or memories that may or may not be stored in a same physical housing. For example, the memory may be a hard disk drive or another storage medium located in a housing different from that of the computer system 160. Therefore, it is understood that a reference to the processor or the computer includes a reference to a set of processors or computers or memories that may or may not operate in parallel. Different from using a single processor to perform the steps described herein, some components such as a steering component and a deceleration component may include respective processors. The processor performs only computation related to a component-specific function.

In various aspects described herein, the processor may be located far away from the vehicle and perform wireless communication with the vehicle. In another aspect, some processes described herein are performed on a processor disposed inside the vehicle, while others are performed by a remote processor, including performing steps necessary for single manipulation.

In some embodiments, the memory 163 may include the instructions 1631 (for example, program logic), and the instructions 1631 may be executed by the processor 161 to perform various functions of the vehicle 100, including the functions described above. The memory 163 may further include additional instructions, including instructions for sending data to, receiving data from, interacting with, and/or controlling one or more of the propulsion system 110, the sensor system 120, the control system 130, and the peripheral device 140.

In addition to the instructions 1631, the memory 163 may further store data such as a road map, route information, a location, direction, speed of the vehicle, other similar vehicle data, and other information. Such information may be used by the vehicle 100 and the computer system 160 when the vehicle 100 operates in an autonomous mode, a semi-autonomous mode, and/or a manual mode.

The user interface 170 is configured to provide information for or receive information from the user of the vehicle 100. Optionally, the user interface 170 may include one or more input/output devices in a set of the peripheral device 140, for example, the wireless communication system 144, the touchscreen 143, the microphone 142, and the speaker 141.

The computer system 160 may control the functions of the vehicle 100 based on inputs received from various subsystems (for example, the propulsion system 110, the sensor system 120, and the control system 130) and from the user interface 170. For example, the computer system 160 may use an input from the control system 130 to control the steering unit 136 to avoid an obstacle detected by the sensor system 120 and the obstacle avoidance system 137. In some embodiments, the computer system 160 may be operated to provide control over many aspects of the vehicle 100 and the subsystems of the vehicle 100.

Optionally, one or more of the foregoing components may be installed separately from or associated with the vehicle 100. For example, the memory 163 may be partially or totally separated from the vehicle 100. The foregoing components may be communicatively coupled together in a wired and/or wireless manner.

Optionally, the foregoing components are merely examples. During actual application, components in the foregoing modules may be added or deleted based on an actual requirement. FIG. 1 shall not be construed as a limitation on embodiments of this application.

The vehicle 100 may be a car, a truck, a motorcycle, a bus, a ship, an airplane, a helicopter, a lawn mower, a recreational vehicle, a playground vehicle, a construction device, a trolley, a golf cart, a train, a transport vehicle, a handcart, or the like. Alternatively, the vehicle 100 may be replaced with another terminal, for example, a mobile phone, a tablet computer, a smart home device, or an intelligent robot. This is not particularly limited in embodiments of this application.

For example, this application provides a broadband antenna that may be used in the vehicle 100 or used in the sensor system 120 of the vehicle 100, to improve a sensing capability of the vehicle 100.

This application provides an antenna. A convex structure and a concave structure are formed on a side of a wide microstrip line. Shapes and sizes of the convex structure and the concave structure, a distance between the convex structures, a distance between the concave structures, and/or a distance between the convex structure and the concave structure are designed to enable the convex structure and the concave structure to resonate at different frequencies. In this way, the convex structure and the concave structure support radiation of signals on different frequency bands. When the antenna operates, cavity-like field distribution can be implemented, so that broadband radiation of the antenna is implemented. For example, a line width of the microstrip line is greater than or equal to 0.25 times a center operating wavelength.

The cavity-like field distribution in this application may be understood as field distribution similar to a waveguide antenna.

Figure 2A:
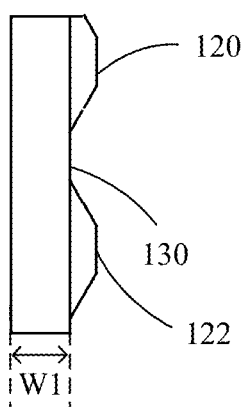
FIG. 2A is a schematic diagram of a microstrip radiation structure according to an embodiment of this application.
Figure 2B:
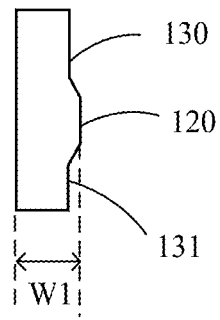
FIG. 2B is a schematic diagram of a microstrip radiation structure according to an embodiment of this application.
Figure 2C:
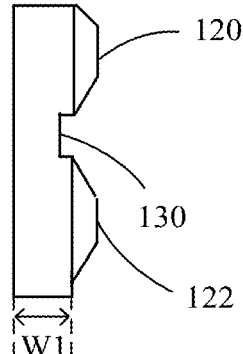
FIG. 2C is a schematic diagram of a microstrip radiation structure according to an embodiment of this application.

The convex structure and the concave structure in this application may be implemented in the following three manners. Refer to FIG. 2A to FIG. 2C.

As shown in FIG. 2A, a convex structure 120 and a convex structure 122 may be added (for example, welded) on one side of a microstrip line whose line width is W1. In this case, a concave structure 130 is formed between the convex structure 120 and the convex structure 122. Alternatively, as shown in FIG. 2B, a part of the microstrip line whose line width is W1 may be removed (for example, corroded) from one side of the microstrip line, to form a concave structure 130 and a concave structure 131. In this case, a convex structure 120 is formed between the concave structure 130 and the concave structure 131.

Alternatively, as shown in FIG. 2C, a microstrip radiation structure 100 may include a convex structure 120 and a convex structure 122 that are added on one side of the microstrip line whose line width is W1, and a plurality of concave structures 130 formed by removing a part of the microstrip line from the side of the microstrip line.

Figure 2D:
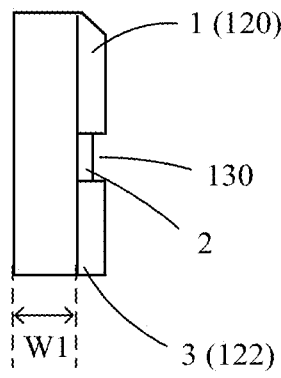
FIG. 2D is a schematic diagram of a microstrip radiation structure according to an embodiment of this application.

Alternatively, as shown in FIG. 2D, a convex part 1, a convex part 2, and a convex part 3 may be added on one side of the microstrip line whose line width is W1, and heights of the convex part 1 and the convex part 3 are both greater than a height of the convex part 2. In this case, the convex part 1 may be considered as a convex structure 120, the convex part 3 may be considered as a convex structure 122, and the convex part 2 may be considered as a concave structure 130.

Therefore, an implementation of the microstrip radiation structure may be flexibly selected based on a line width of an actual microstrip line and a performance requirement of the antenna.

The convex structure and the concave structure in this application may support different operating frequency bands. It may be understood that the convex structure supports radiation of a signal on a first frequency band, and the concave structure supports radiation of a signal on a second frequency band. The first frequency band is completely different from the second frequency band. In other words, the first frequency band does not coincide with the second frequency band. For example, the first frequency band is 76 gigahertz (GHz) to 78 GHZ, and the second frequency band is 79 GHz and 80 GHz. It can be learned that the first frequency band does not coincide with the second frequency band. Optionally, the first frequency band overlaps with the second frequency band. For example, the first frequency band is 76 GHz to 78 GHz, and the second frequency band is 78 GHz to 80 GHz. It can be learned that the first frequency band overlaps with the second frequency band at a frequency 78 GHz. Alternatively, the first frequency band is 76 GHz to 78 GHZ, and the second frequency band is 77 GHz to 80 GHz. It can be learned that the first frequency band overlaps with the second frequency band on a frequency band 77 GHz and 78 GHz.

The following describes in detail the antenna provided in this application with reference to FIG. 3 to FIG. 9C.

Figure 3:
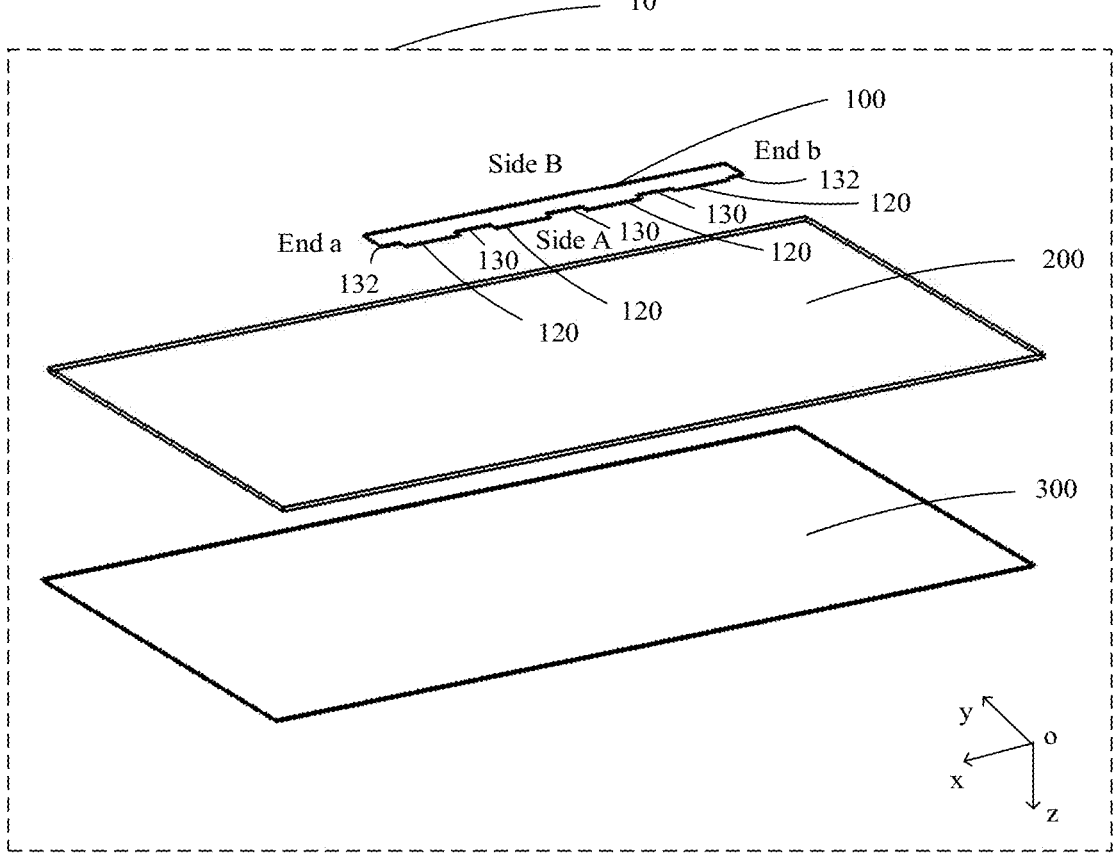
FIG. 3 is a schematic diagram of a structure of an antenna according to an embodiment of this application.

FIG. 3 is a schematic diagram of a structure of an antenna according to an embodiment of this application. The antenna 10 includes a metal floor 300, a dielectric substrate 200, and a microstrip radiation structure 100. The metal floor 300 and the microstrip radiation structure 100 are respectively disposed on two sides of the dielectric substrate 200. One side (a side A in FIG. 3) of the microstrip radiation structure 100 includes a first radiating element 120 and a second radiating element (130 or 132). The first radiating element 120 is a radiating element formed by a convex structure, and may support radiation of a signal on a first frequency band. The second radiating element (130 or 132) is a radiating element formed by a concave structure, and may support radiation of a signal on a second frequency band.

The microstrip radiation structure 100 shown in FIG. 3 is a long-strip structure. Edges of the microstrip radiation structure 100 in a length direction may be understood as sides of the microstrip radiation structure 100, namely, the side A and a side B in an x direction shown in the figure. Edges of the microstrip radiation structure 100 in a width direction may be understood as ends of the microstrip radiation structure 100, namely, an end a and an end b in a y direction shown in the figure. The side A is opposite to the side B, and the end a is opposite to the end b. Optionally, the end a is configured to feed the antenna 10, and the end b is an open circuit or a short circuit. Alternatively, the end b is configured to feed the antenna 10, and the end a is an open circuit or a short circuit.

Both the first radiating element 120 and the second radiating element (130 or 132) shown in FIG. 3 are disposed on the side A of the microstrip radiation structure 100. Optionally, the first radiating element 120 and the second radiating element (130 or 132) may also be disposed on the side B of the microstrip radiation structure 100.

As shown in FIG. 3, there are four first radiating elements 120, and there are five second radiating elements (130 and 132). Optionally, the microstrip radiation structure 100 may alternatively include another quantity of first radiating elements, for example, seven first radiating elements. The microstrip radiation structure 100 may alternatively include another quantity of second radiating elements, for example, eight second radiating elements. A quantity of first radiating elements and a quantity of second radiating elements are not limited in this embodiment of this application.

Figure 4A:
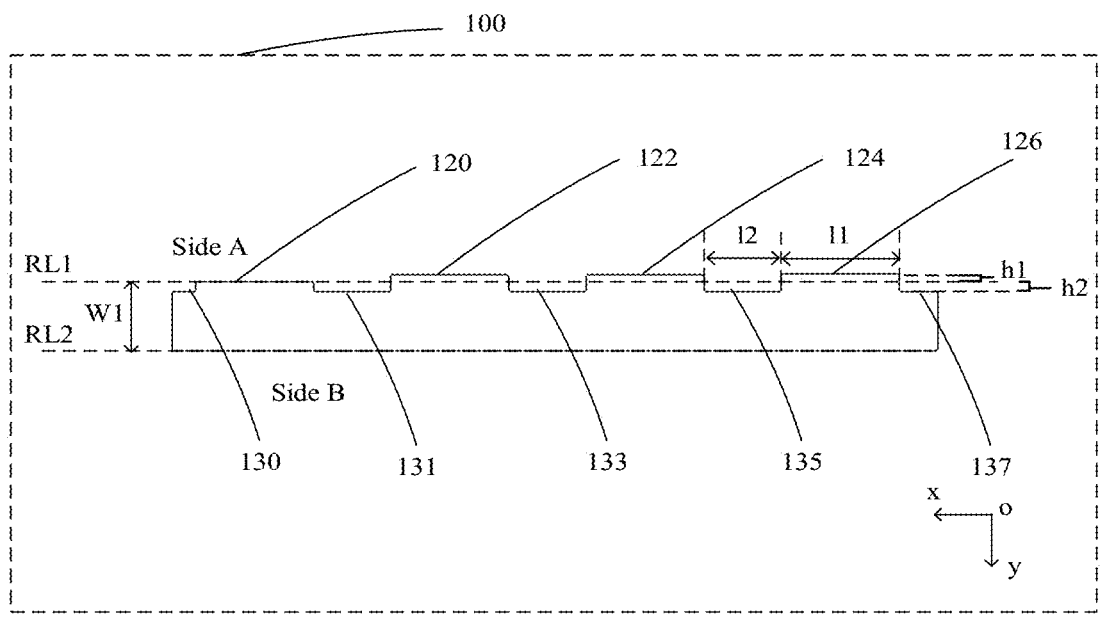
FIG. 4A is a schematic diagram of a size of a microstrip radiation structure according to an embodiment of this application.

For ease of understanding the antenna provided in this application, the following describes a size of the antenna in this application with reference to FIG. 4A. FIG. 4A is a schematic diagram of a planar structure of a microstrip radiation structure of an antenna according to this application. The microstrip radiation structure shown in FIG. 4A is in an xoy coordinate system shown in the figure. Structure parameters of the microstrip radiation structure 100 include structure parameters in a first direction (an x direction shown in the figure, where the first direction is indicated by the x direction below) and structure parameters in a second direction (a y direction shown in the figure, where the second direction is indicated by the y direction below). The structure parameters in the x direction include a length l1 of the first radiating element (120, 122, 124, or 126) and a length l2 of the second radiating element (130, 131, 133, 135, or 137). The structure parameters in the y direction include a width W2 of the microstrip radiation structure 100, a width h1 of the first radiating element (120, 122, 124, or 126) in the y direction, and a width h2 of the second radiating element (130, 131, 133, 135, or 137) in the y direction.

The structure parameters of the microstrip radiation structure 100 in the x direction are first described.

Length l1 of the first radiating element (120, 122, 124, or 126) in the x direction:

The length l1 of the first radiating element (120, 122, 124, or 126) in the x direction is a distance between two farthest points of the first radiating element (120, 122, 124, or 126) in the x direction. Refer to l1 shown in FIG. 4A.

Length l2 of the second radiating element (130, 131, 133, 135, or 137) in the x direction:

The length l2 of the second radiating element (130, 131, 133, 135, or 137) in the x direction is a distance between two farthest points of the second radiating element (130, 131, 133, 135, or 137) in the x direction. Refer to l2 shown in FIG. 4A.

Then, the structure parameters of the microstrip radiation structure 100 in the y direction are described.

Width W2 of the microstrip radiation structure 100:

The width W2 of the microstrip radiation structure 100 is a length in the y direction. Refer to FIG. 2A or FIG. 2C. The width W2 of the microstrip radiation structure 100 is a sum of the width W1 of the microstrip line and the width h1 of the first radiating element. Alternatively, as shown in FIG. 2B, the width W2 of the microstrip radiation structure 100 is equal to the width W1 of the microstrip line.

Optionally, when the two sides of the microstrip radiation structure each include the first radiating element, the width W2 of the microstrip radiation structure may be a sum of the width W1 of the microstrip line, a width h11 of the first radiating element on one side of the microstrip radiation structure, and a width h12 of the first radiating element on the other side of the microstrip radiation structure. Alternatively, the width W2 of the microstrip radiation structure may be a sum of the width W1 of the microstrip line and a width h11 of the first radiating element on one side of the microstrip radiation structure. Alternatively, the width W2 of the microstrip radiation structure may be a sum of the width W1 of the microstrip line and a width h12 of the first radiating element on the other side of the microstrip radiation structure. Alternatively, the width W2 of the microstrip radiation structure is equal to the width W1 of the microstrip line.

Width h1 of the first radiating element in the y direction:

As shown in FIG. 4A, a reference line RL1 is a reference line parallel to the microstrip radiation structure 100 in the x direction (for example, parallel to an x-axis), and the reference line RL1 is close to the side A of the microstrip radiation structure 100. A reference line RL2 is a reference line parallel to the microstrip radiation structure 100 in the x direction (for example, parallel to the x-axis), and the reference line RL2 is close to the side B of the microstrip radiation structure 100.

The width h1 of the first radiating element in the y direction is a distance between a highest point of a convex part of the first radiating element and a reference line (RL2 or RL1). If the first radiating element is located on the side A of the microstrip radiation structure 100, the width h1 of the first radiating element in the y direction is a distance between the highest point of the convex part and the reference line RL1. Alternatively, if the first radiating element is located on the side B of the microstrip radiation structure 100, the width h1 of the first radiating element in the y direction is a distance between the highest point of the convex part and the reference line RL2. In other words, the width h1 of the first radiating element in the y direction is a distance between the highest point of the convex part of the first radiating element and a reference line on a same side. The width h1 of the first radiating element in the y direction is shown in FIG. 4A.

Width h2 of the second radiating element in the y direction:

The width h2 of the second radiating element in the y direction is a distance between a deepest point of a concave part of the second radiating element and a reference line (RL2 or RL1). If the second radiating element is located on the side A of the microstrip radiation structure 100, the width h2 of the second radiating element in the y direction is a distance between the deepest point of the concave part and the reference line RL1. Alternatively, if the second radiating element is located on the side B of the microstrip radiation structure 100, the width h2 of the second radiating element in the y direction is a distance between the deepest point of the concave part and the reference line RL2. In other words, the width h2 of the second radiating element in the y direction is a distance between the deepest point of the concave part of the second radiating element and a reference line on a same side. The width h2 of the second radiating element in the y direction is shown in FIG. 4A.

The reference line RL1 or the reference line RL2 may be determined in any one of the following manners.

Manner 1: The reference line RL1 or the reference line RL2 is a straight line (L1) that passes through the highest point of the convex part of the first radiating element and that is parallel to the x-axis. When the microstrip radiation structure 100 includes a plurality of first radiating elements, and h1 of the first radiating element 126 is the greatest, the reference line RL1 is the straight line that passes through the highest point of the convex part of the first radiating element 126 and that is parallel to the x-axis.

Manner 2: The reference line RL1 or the reference line RL2 is a straight line (L2) that passes through the deepest point of the concave part of the second radiating element and that is parallel to the x-axis. When the microstrip radiation structure 100 includes a plurality of second radiating elements, and h2 of the second radiating element 137 is the greatest, the reference line RL1 or the reference line RL2 is the straight line that passes through the deepest point of the concave part of the second radiating element 137 whose h2 is the greatest and that is parallel to the x-axis.

Manner 3: With reference to the manner 1 and the manner 2, the reference line RL1 or the reference line RL2 is a straight line that passes through any point between the straight line L1 and the straight line L2 and that is parallel to the x-axis.

It can be learned that specific values of the width h1 of the first radiating element in the y direction and the width h2 of the second radiating element in the y direction are directly related to the reference line RL1 or the reference line RL2. When the reference line is set as that shown in FIG. 4A, a value of h11 of the first radiating element 120 is 0, and a value of h12 of the first radiating element 126 is not 0.

The structure parameters of the microstrip radiation structure 100 in the y direction provided in this application includes the width W2 of the microstrip radiation structure 100, the width h1 of the first radiating element in the y direction, and the width h2 of the second radiating element in the y direction. Values of the structure parameters W2, h1, and h2 are related to the reference line.

In an example, according to the microstrip radiation structure 100 provided in this application, the convex structure and the concave structure are formed on the wide microstrip line whose width is greater than or equal to 0.25 times the center operating wavelength of the antenna. In addition, the following structure parameters may be separately designed: the length l1 of the first radiating element, the length l2 of the second radiating element, the width W2 of the microstrip radiation structure 100, the width h1 of the first radiating element in the y direction, and the width h2 of the second radiating element in the y direction. Equivalents of l1 and h1 may be determined based on an actual shape of the first radiating element. For example, when a shape of the first radiating element is a semicircle, l1 may be an equivalent to a diameter of the semicircle, and h1 is an equivalent to a radius of the semicircle. Equivalents of l2 and h2 may be determined based on an actual shape of the second radiating element. In this way, resonance frequencies of the convex structure and the concave structure are adjusted, so that different broadband antennas can be implemented based on an actual requirement. For example, when the second radiating element is a semicircle, l2 may be equivalent to a diameter of the semicircle, and h2 is equivalent to a radius of the semicircle.

Figure 4B:
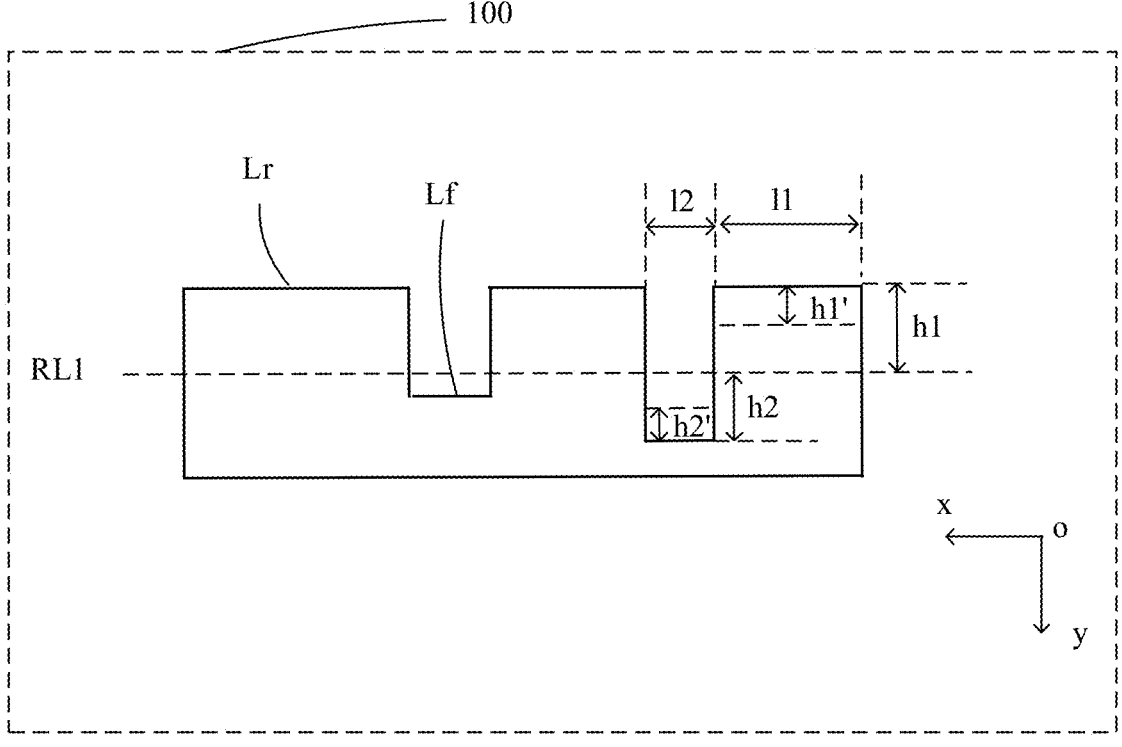
FIG. 4B is a schematic diagram of a size of a microstrip radiation structure according to an embodiment of this application.

The following describes a relationship and a difference between the first radiating element and the convex structure, and a relationship and a difference between the second radiating element and the concave structure. The first radiating element formed by the convex structure may resonate on the first frequency band, and the second radiating element formed by the concave structure may resonate on the second frequency band. The convex structure may be the equivalent to the first radiating element. In other words, the convex structure and the first radiating element are the same. Optionally, as shown in FIG. 4B, a part of the convex structure may be the equivalent to the first radiating element. For example, a convex side Lr of the convex structure is the equivalent to the first radiating element. Further, as shown in FIG. 4B, the convex structure is a rectangle whose length is l1 and width is h1, and the first radiating element may be a rectangle whose length is l1 and width is h1' in the rectangle, where h1' is less than h1. Similarly, a part of the concave structure is the equivalent to the second radiating element. Optionally, as shown in FIG. 4B, a concave side Lf of the concave structure may be the equivalent to the second radiating element. Further, as shown in FIG. 4B, the concave structure is a rectangle whose length is l2 and width is h2, and the second radiating element may be a rectangle whose length is l2 and width is h2' in the rectangle, where h2' is less than h2. Alternatively, the entire concave structure is the equivalent to the second radiating element.

It may be understood that the microstrip radiation structure 100 provided in this embodiment of this application may be a metal layer of a PCB, and the microstrip radiation structure 100 may be approximately understood as a planar structure.

For ease of description below, the convex structure and the first radiating element are the same, and the concave structure and the second radiating element are the same. For example, in the following descriptions, a shape of the first radiating element may also be represented as a shape of the convex structure, and a shape of the second radiating element may also be represented as a shape of the concave structure. The shape of the first radiating element and the shape of the second radiating element in this application may also be flexibly designed as required.

Figure 5A:
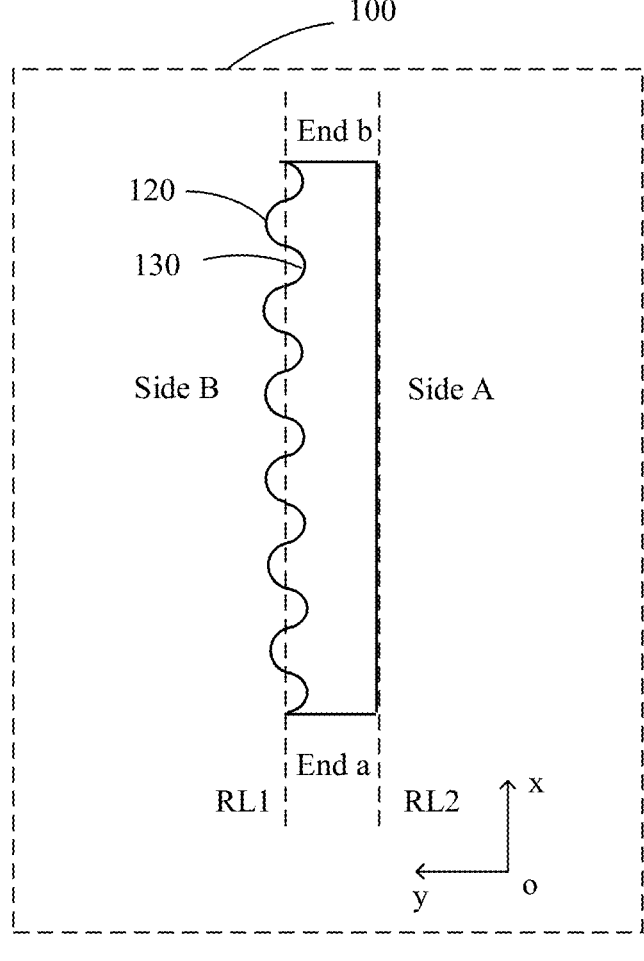
FIG. 5A is a schematic diagram of a microstrip radiation structure according to an embodiment of this application.
Figure 5B:
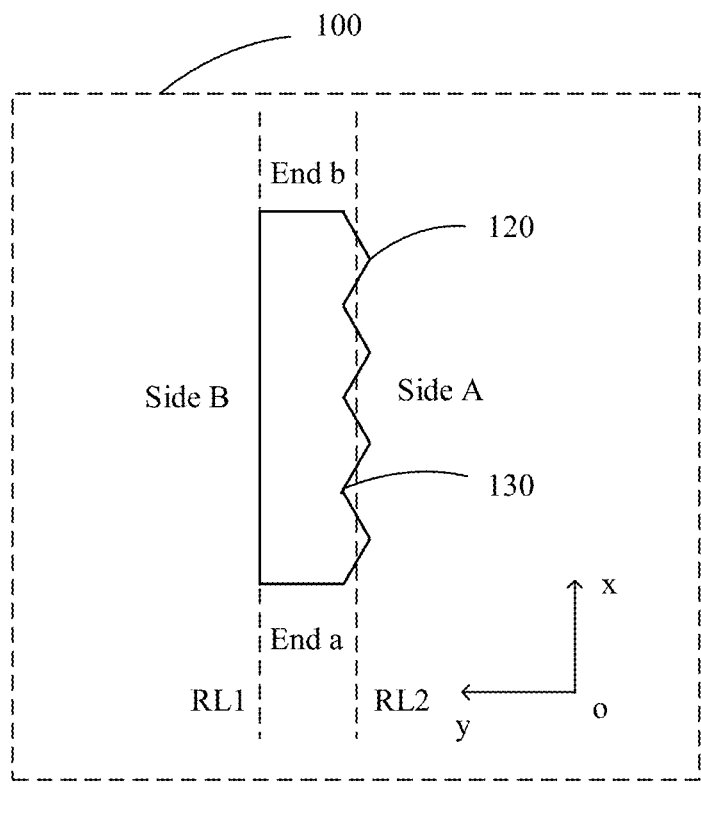
FIG. 5B is a schematic diagram of a microstrip radiation structure according to an embodiment of this application.
Figures 5C, 6:
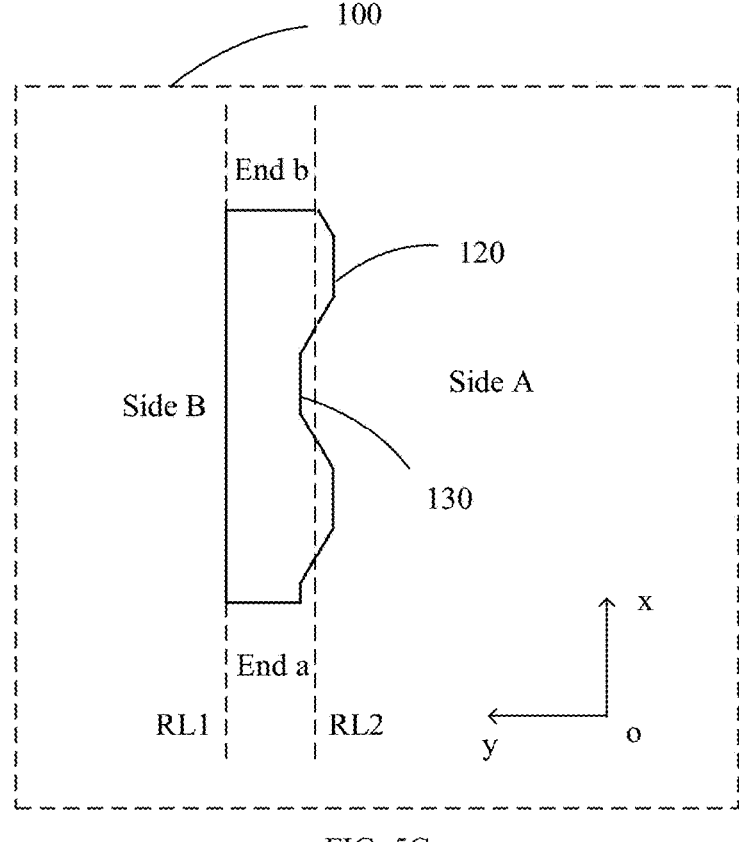
FIG. 5C is a schematic diagram of a microstrip radiation structure according to an embodiment of this application.
FIG. 6 is a schematic diagram of a microstrip radiation structure according to an embodiment of this application.

The shape of the first radiating element or the shape of the concave structure may be the rectangle shown in the foregoing figure, or the shape of the first radiating element or the shape of the second radiating element may be a semicircle shown in FIG. 5A. In this case, a "wavy line" is formed on the side B of the radiation structure shown in FIG. 5A. The shape of the first radiating element or the shape of the second radiating element may alternatively be a triangle shown in FIG. 5B. In this case, a "zigzag line" is formed on the side A of the radiation structure shown in FIG. 5B. Alternatively, as shown in FIG. 5C, the shape of the first radiating element or the shape of the second radiating element may be a trapezoid. FIG. 5A to FIG. 5C are merely intended to show a design of a shape of a single first radiating element or a design of a shape of a single second radiating element. For whether shapes of a plurality of first radiating elements are the same, a quantity of first radiating elements, and a design of a spacing between different first radiating elements, refer to another corresponding embodiment of this application. Similarly, for whether shapes of a plurality of second radiating elements are the same, a quantity of second radiating elements, and a design of a spacing between different second radiating elements, refer to another corresponding embodiment of this application.

FIG. 5A to FIG. 5C show only implementations of the three shapes of the first radiating element (or the shapes of the second radiating element). Optionally, the shape of the first radiating element may be one of the following shapes or a shape formed by a combination of the following plurality of shapes: a sector, a semicircle, a circle, an oval, a triangle, a quadrilateral, or another polygon (a quantity of sides is greater than 4). Optionally, the quadrilateral includes any one of the following: a trapezoid, a parallelogram, or a non-parallelogram. The parallelogram includes any one of the following: a rectangle, a square, or a rhombus. Optionally, the shape of the second radiating element is one of the following shapes or a shape formed by a combination of the following plurality of shapes: a sector, a semicircle, a circle, an oval, a triangle, a quadrilateral, or a polygon (a quantity of sides is greater than 4). Optionally, the quadrilateral includes any one of the following: a trapezoid, a parallelogram, or a non-parallelogram. The parallelogram includes any one of the following: a rectangle, a square, or a rhombus.

In addition, to achieve a better feeding effect for the antenna provided in this application, a feed end of the microstrip radiation structure may further include an impedance matching structure. The impedance matching structure provided in this application may also be flexibly designed as required. The feed end of the microstrip radiation structure may be either of two ends of the microstrip radiation structure. When the end a of the microstrip radiation structure is set as the feed end, the end b of the microstrip radiation structure is a tail end. Alternatively, when the end b of the microstrip radiation structure is set as the feed end, the end a of the microstrip radiation structure is a tail end. Optionally, as shown in FIG. 6, the microstrip radiation structure 100 further includes an impedance matching structure 101, and the impedance matching structure 101 is disposed at a first end of the microstrip radiation structure 100, namely, the end b shown in FIG. 6. The impedance matching structure 101 is used to match impedance of the antenna. The impedance matching structure 101 shown in FIG. 6 is a single-stage matching structure. Optionally, the microstrip radiation structure 100 includes a feed port 102. Optionally, the microstrip radiation structure 100 may alternatively include a multi-stage impedance matching structure. The impedance matching structure included in the microstrip radiation structure is two-stage impedance matching structure, three-stage impedance matching structure, or another multi-stage impedance matching structure. A quantity of stages of the impedance matching structure is not limited in this application.

Figure 7:
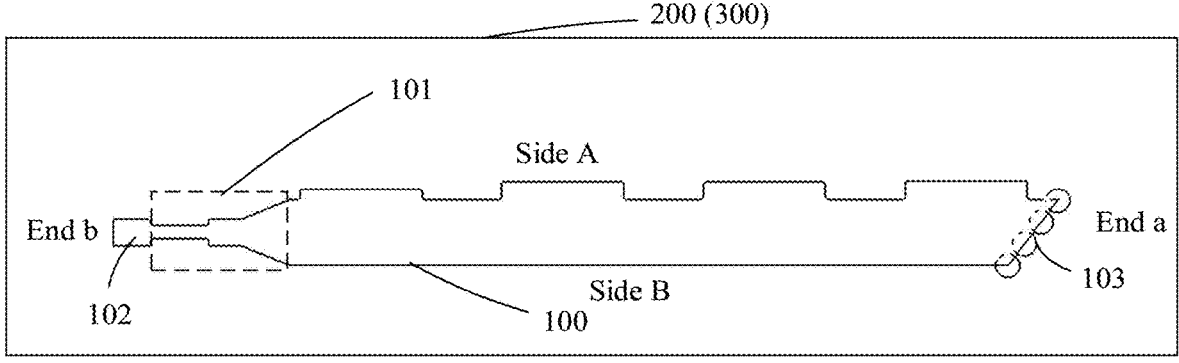
FIG. 7 is a schematic diagram of a top-view structure of an antenna according to an embodiment of this application.

The tail end of the microstrip radiation structure provided in this application may be an open circuit shown in the foregoing figure. With reference to the antenna shown in FIG. 3, when the end a of the microstrip radiation structure 100 is used for feeding, the tail end (for example, the end b) of the microstrip radiation structure 100 is an open circuit, namely, the end b shown in FIG. 3. Alternatively, the tail end of the microstrip radiation structure provided in this application may be a short circuit. FIG. 7 is a schematic diagram of a top-view structure of an antenna 10 according to an embodiment of this application. In the antenna, the end a shown in FIG. 7 is electrically connected to the metal floor 300 of the antenna 10 by using a plated through hole 103. Optionally, as shown in FIG. 7, the end a of the microstrip radiation structure 100 may be electrically connected to the metal floor 300 of the antenna 10 by using a plurality of plated through holes 103. The impedance matching structure 101 and the feed port 102 that are shown in FIG. 7 are the same as those in the embodiment shown in FIG. 6. Details are not described herein again.

In this way, the tail end of the microstrip radiation structure is grounded, to improve stability of the antenna.

Figure 8:
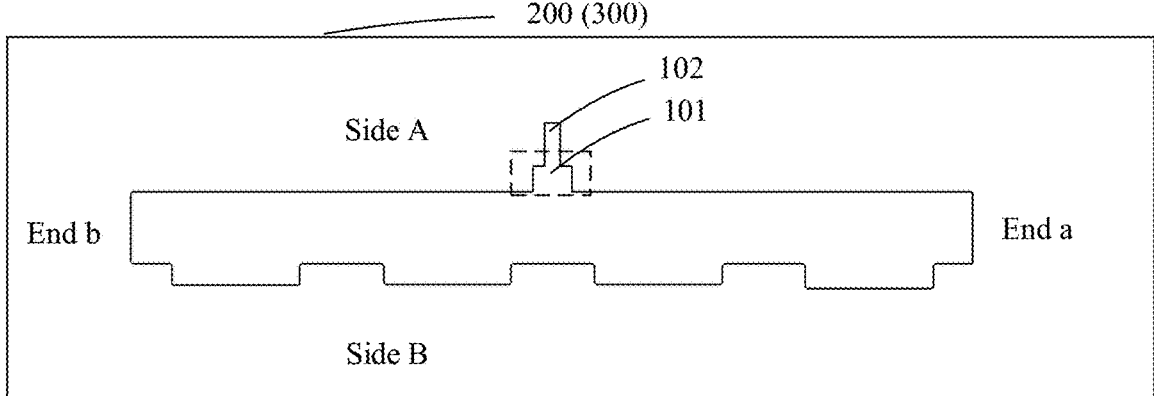
FIG. 8 is a schematic diagram of feeding of an antenna according to an embodiment of this application.

A feeding manner of the antenna provided in this application may also be flexibly designed. In addition to feeding at one end of the microstrip radiation structure 100, which is also referred to as end feeding, namely, the end a or the end b shown in the foregoing figure, feeding may be performed on one side of the microstrip radiation structure 100, or back feeding is performed when a feed line passes through the metal floor and the dielectric substrate. As shown in FIG. 8, the feed port 102 is led out from the side A of the microstrip radiation structure 100, and therefore side feeding may be performed on the side A of the microstrip radiation structure 100. Optionally, in the antenna shown in FIG. 8, the microstrip radiation structure 100 may further include the impedance matching structure 101.

Optionally, the feed line may pass through the metal floor and the dielectric substrate. In this case, a core wire of the feed line is electrically connected to a feed point of the microstrip radiation structure, and an outer conductor of the feed line is electrically connected to the metal floor of the antenna, to implement back feeding for the antenna.

It can be learned that, because the first radiating element and the second radiating element of the antenna provided in this application may separately resonate at different frequencies, a feed point may be flexibly selected based on resonance characteristics of the two radiating elements, and the feeding manner of the antenna may be further flexibly designed.

In conclusion, the antenna on which broadband radiation is formed provided that the convex structure and the concave structure are formed on the wide microstrip line (the width of the microstrip line is greater than or equal to 0.25 times the center operating wavelength), and the convex structure and the concave structure may resonate at different frequencies to form radiation on different frequency bands falls within the protection scope of this application. In other words, the microstrip radiation structure having at least one first radiating element and at least one second radiating element falls within the protection scope of this application.

The following provides descriptions by using an example in which the microstrip radiation structure includes a plurality of first radiating elements and a plurality of second radiating elements. A shape of each first radiating element and/or a shape of each second radiating element may be flexibly designed, a spacing between the first radiating elements may be flexibly designed, and a spacing between the second radiating elements may be flexibly designed. The following describes different implementations of the microstrip radiation structure. A quantity of first radiating elements and a quantity of second radiating elements are not limited in this application.

Figure 9A:
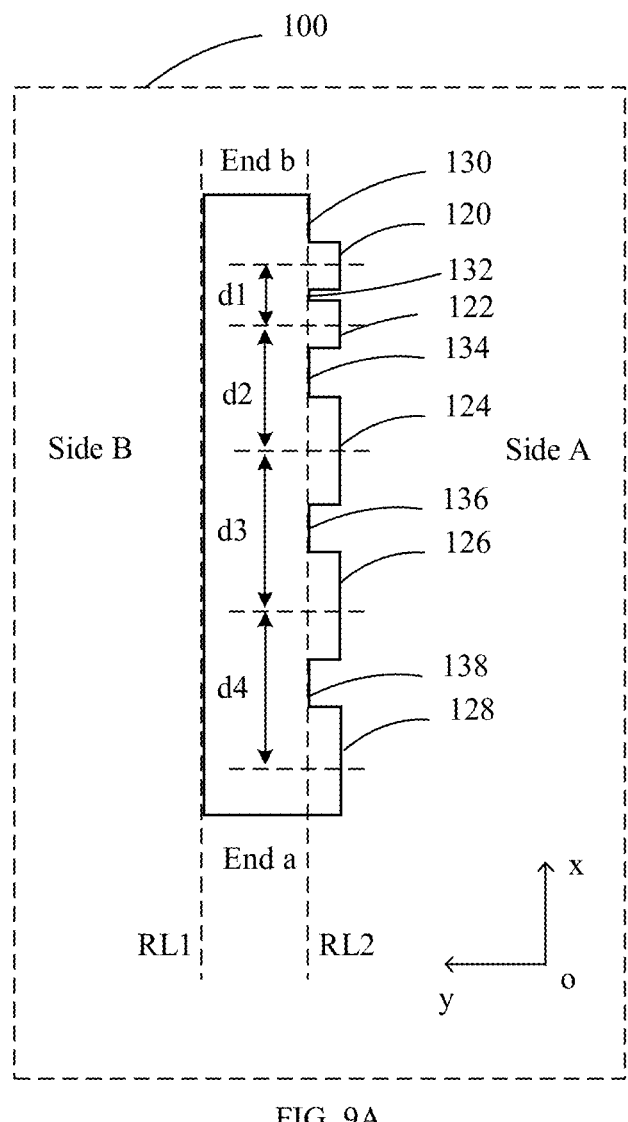
FIG. 9A is a schematic diagram of a microstrip radiation structure according to an embodiment of this application.

When the microstrip radiation structure includes a plurality of first radiating elements and a plurality of second radiating elements, a spacing between the first radiating elements may be flexibly designed, or a spacing between the second radiating elements may be flexibly designed, or a spacing between the first radiating element and the second radiating element may be flexibly designed. As shown in FIG. 9A, the microstrip radiation structure 100 includes five first radiating elements and five second radiating elements. The five first radiating elements include a first radiating element 120, a first radiating element 122, a first radiating element 124, a first radiating element 126, and a first radiating element 128. The five second radiating elements include a second radiating element 130, a second radiating element 132, a second radiating element 134, a second radiating element 136, and a second radiating element 138. It can be learned from FIG. 9A that a distance d1 between a center of the first radiating element 120 and a center of the first radiating element 122 is unequal to a distance d2 between the center of the first radiating element 122 and a center of the first radiating element 124, and a distance d3 between a center of the first radiating element 124 and a center of the first radiating element 126 is equal to a distance d4 between the center of the first radiating element 126 and a center of the first radiating element 128. It can be further learned from FIG. 9A that a distance d1' (not marked) between a center of the second radiating element 130 and a center of the second radiating element 132 is unequal to a distance d2' (not marked) between a center of the second radiating element 134 and a center of the second radiating element 136, and the distance d2' between the center of the second radiating element 134 and the center of the second radiating element 136 is equal to a distance d3' (not marked) between the center of the second radiating element 136 and a center of the second radiating element 138. FIG. 9A provides descriptions by using a spacing between the plurality of first radiating elements or a spacing between the plurality of second radiating elements as an example. Optionally, a spacing between the first radiating element and the second radiating element may be flexibly designed.

The microstrip radiation structure 100 shown in FIG. 9A can be used in the antenna provided in this application. For structure parameters of the microstrip radiation structure 100, a feeding manner of the antenna, and another implementation of the microstrip radiation structure 100, for example, the microstrip radiation structure 100 may include an impedance matching structure, refer to the embodiments shown in FIG. 2 to FIG. 8. Details are not described herein again.

Figure 9B:
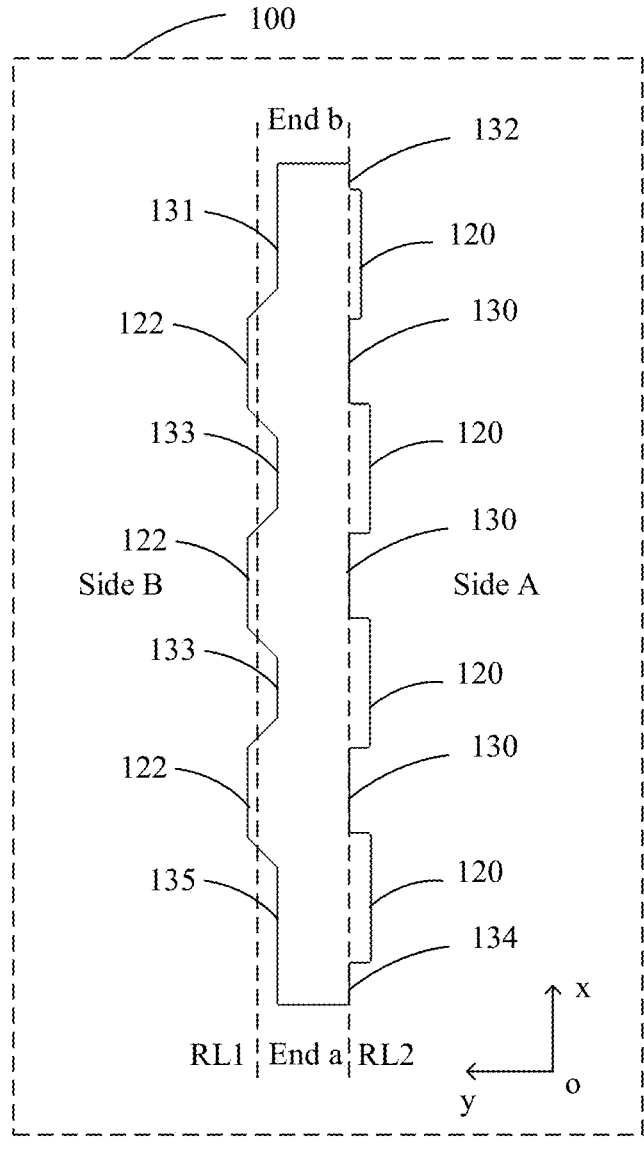
FIG. 9B is a schematic diagram of a microstrip radiation structure according to an embodiment of this application.

For example, as shown in FIG. 9A, when the microstrip radiation structure includes a plurality of first radiating elements, the plurality of first radiating elements may be flexibly disposed on a same side of the microstrip radiation structure. Alternatively, the plurality of first radiating elements may be flexibly disposed on different sides of the microstrip radiation structure. As shown in FIG. 9B, four first radiating elements 120 are disposed on the side A of the microstrip radiation structure 100, and three first radiating elements 122 are disposed on the side B of the microstrip radiation structure 100. Optionally, locations of the first radiating elements on a second side correspond to locations of second radiating elements on a first side. Optionally, a connection line between a center point of the first radiating element on the second side in the x direction and a center point of the second radiating element on the first side in the x direction is parallel to the y-axis. In other words, the first radiating elements on the second side correspond to the second radiating elements on the first side. For example, the first radiating element 122 on the side B corresponds to the second radiating element 130 on the side A. Shapes of convex structures on one side (the side A or the side B) of the microstrip radiation structure 100 shown in FIG. 9B are the same. Optionally, shapes of convex structures on one side (the side A or the side B) of the microstrip radiation structure 100 may be partially the same or completely different. Shapes of convex structures on the side A of the microstrip radiation structure 100 shown in FIG. 9B are different from that on the side B. Optionally, shapes of convex structures on two sides of the microstrip radiation structure may be the same or partially the same. For details, refer to FIG. 9C. For an implementation of the spacing between the first radiating elements, refer to FIG. 9B. Details are not described herein again. Similarly, the microstrip radiation structure 100 shown in FIG. 9B can be used in the antenna provided in this application. For structure parameters of the microstrip radiation structure 100, a feeding manner of the antenna, and another implementation of the microstrip radiation structure 100, for example, the microstrip radiation structure 100 may include an impedance matching structure, refer to the embodiments shown in FIG. 2 to FIG. 8. Details are not described herein again.

Similarly, for example, as shown in FIG. 9A, when the microstrip radiation structure includes a plurality of second radiating elements, the plurality of second radiating elements may also be flexibly disposed on the same side of the microstrip radiation structure. Alternatively, the plurality of second radiating elements may be flexibly disposed on different sides of the microstrip radiation structure. As shown in FIG. 9B, a plurality of second radiating elements (130, 132, and 134) are disposed on the side A of the microstrip radiation structure 100, and a plurality of second radiating elements (131, 133, and 135) are disposed on the side B of the microstrip radiation structure 100. Optionally, the second radiating elements on the second side correspond to first radiating elements on the first side. Optionally, a connection line between a center point of the second radiating element on the second side in the x direction and a center point of the first radiating element on the first side in the x direction is parallel to the y-axis. In other words, the second radiating elements on the second side correspond to the first radiating elements on the first side. For example, the second radiating element 133 on the side B corresponds to the first radiating element 120 on the side A. Shapes of concave structures on one side (the side A or the side B) of the microstrip radiation structure 100 shown in FIG. 9B are the same. Optionally, shapes of concave structures on one side (for example, the side A or the side B) of the microstrip radiation structure 100 may be partially the same or completely different. Shapes of concave structures on the side A of the microstrip radiation structure 100 shown in FIG. 9B are different from that on the side B. Optionally, shapes of concave structures on two sides of the microstrip radiation structure may be the same or partially the same. For details, refer to FIG. 9C. For an implementation of the spacing between the second radiating elements, refer to FIG. 9A. Details are not described herein again. Similarly, the microstrip radiation structure 100 shown in FIG. 9B can be used in the antenna provided in this application. For structure parameters of the microstrip radiation structure 100, a feeding manner of the antenna, and another implementation of the microstrip radiation structure 100, for example, the microstrip radiation structure 100 may include an impedance matching structure, refer to the embodiments shown in FIG. 2 to FIG. 8. Details are not described herein again.

When the microstrip radiation structure includes a plurality of first radiating elements and/or a plurality of second radiating elements, a combination of shape designs of the plurality of first radiating elements and/or the plurality of second radiating elements is described in this embodiment of this application with reference to the embodiments of the shape of the first radiating element and/or the shape of the second radiating element provided in FIG. 5A to FIG. 5C. The shape of the first radiating element is used as an example for description. As shown in FIG. 5A and FIG. 5B, the plurality of first radiating elements may be uniformly designed as a same shape. Alternatively, shapes of the first radiating elements in the plurality of first radiating elements may be separately designed. The shapes of the first radiating elements in the plurality of first radiating elements are partially the same. As shown in FIG. 9B, shapes of the first radiating elements on the side A of the microstrip radiation structure 100 are different from shapes of the first radiating elements on the side B, and shapes of the first radiating elements on the side A (or the side B) of the microstrip radiation structure 100 are the same. Alternatively, shapes of some first radiating elements on the side A of the microstrip radiation structure 100 are the same. Alternatively, shapes of some first radiating elements on the side B are the same. Alternatively, shapes of some first radiating elements on the side A of the microstrip radiation structure 100 are the same as shapes of some first radiating elements on the side B, and shapes of the other first radiating elements on the side A of the microstrip radiation structure 100 are different from shapes of the other first radiating elements on the side B. Similarly, shape designs of the second radiating elements are the same as those of the first radiating elements in the foregoing descriptions. Details are not described herein again.

Figure 9C:
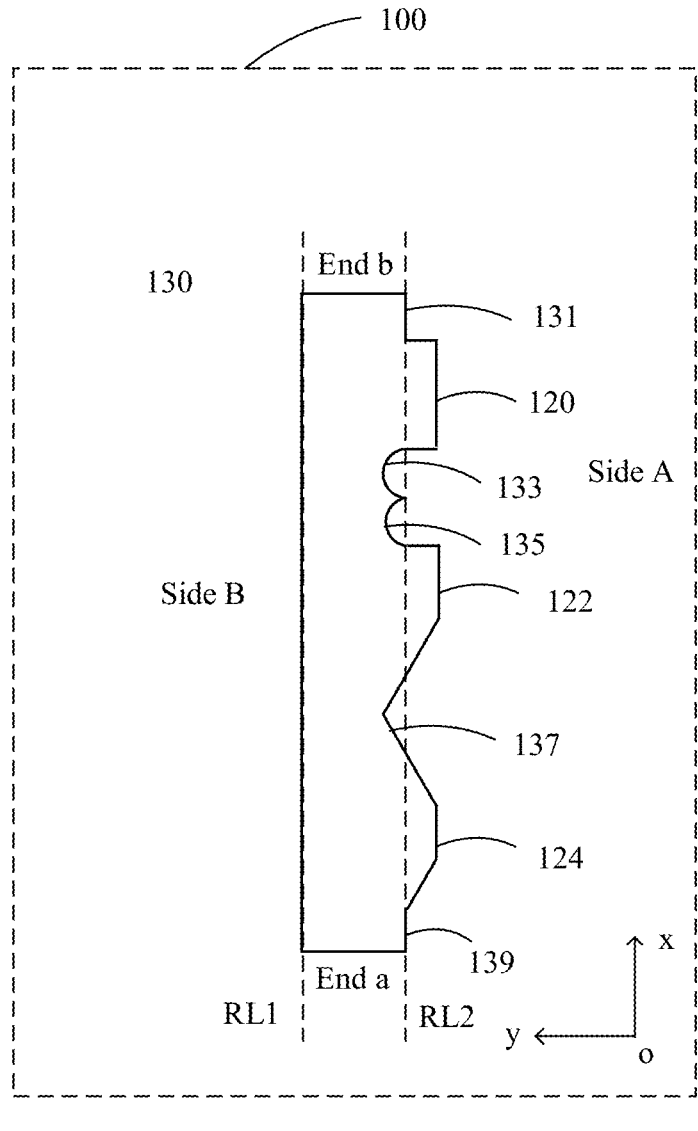
FIG. 9C is a schematic diagram of a microstrip radiation structure according to an embodiment of this application.

Alternatively, shapes of the first radiating elements on the side A of the microstrip radiation structure 100 are different from shapes of the second radiating elements on the side A. FIG. 9C is a schematic diagram of a structure of a microstrip radiation structure 100 according to an embodiment of this application. The microstrip radiation structure 100 includes first radiating elements (120, 122, and 124) and second radiating elements (131, 133, 135, 137, and 139). Shapes of the first radiating elements (120, 122, and 124) are all different, and a shape of the second radiating element 133 is the same as that of the second radiating element 135, but is different from shapes of other second radiating elements (131, 137, and 139). In addition, two second radiating elements (133 and 135) may be included between the first radiating element 120 and the first radiating element 122. Optionally, there may be a plurality of second radiating elements between adjacent first radiating elements, or there may be a plurality of first radiating elements between adjacent second radiating elements.

Similarly, the microstrip radiation structure 100 shown in FIG. 9C can be used in the antenna provided in this application. For structure parameters of the microstrip radiation structure 100, a feeding manner of the antenna, and another implementation of the microstrip radiation structure 100, for example, the microstrip radiation structure 100 may include an impedance matching structure, refer to the embodiments shown in FIG. 2 to FIG. 8. Details are not described herein again. Optionally, the embodiments shown in FIG. 9A to FIG. 9C may be implemented in any combination thereof. Optionally, the embodiments shown in FIG. 2 to FIG. 9C may be implemented in any combination thereof.

It can be learned from FIG. 9A to FIG. 9C that the microstrip radiation structure in this application may be flexibly designed. In an example, a quantity of first radiating elements in the microstrip radiation structure may be flexibly designed, a spacing between two adjacent first radiating elements may be flexibly designed, and shapes of different first radiating elements may be flexibly designed. In addition, when the microstrip radiation structure includes a plurality of first radiating elements, the plurality of first radiating elements may be designed on a same side of the microstrip radiation structure or designed on two sides of the microstrip radiation structure. Similarly, a quantity of second radiating elements in the microstrip radiation structure may be flexibly designed, a spacing between two adjacent second radiating elements may be flexibly designed, and shapes of different second radiating elements may be flexibly designed. In addition, when the microstrip radiation structure includes a plurality of second radiating elements, the plurality of second radiating elements may be designed on a same side of the microstrip radiation structure or designed on two sides of the microstrip radiation structure.

It can be learned that the microstrip radiation structure provided in this application may be flexibly designed based on an actual requirement, and a degree of design freedom is high, so that the antenna having the microstrip radiation structure provided in this application can meet different design requirements.

Figure 10A:
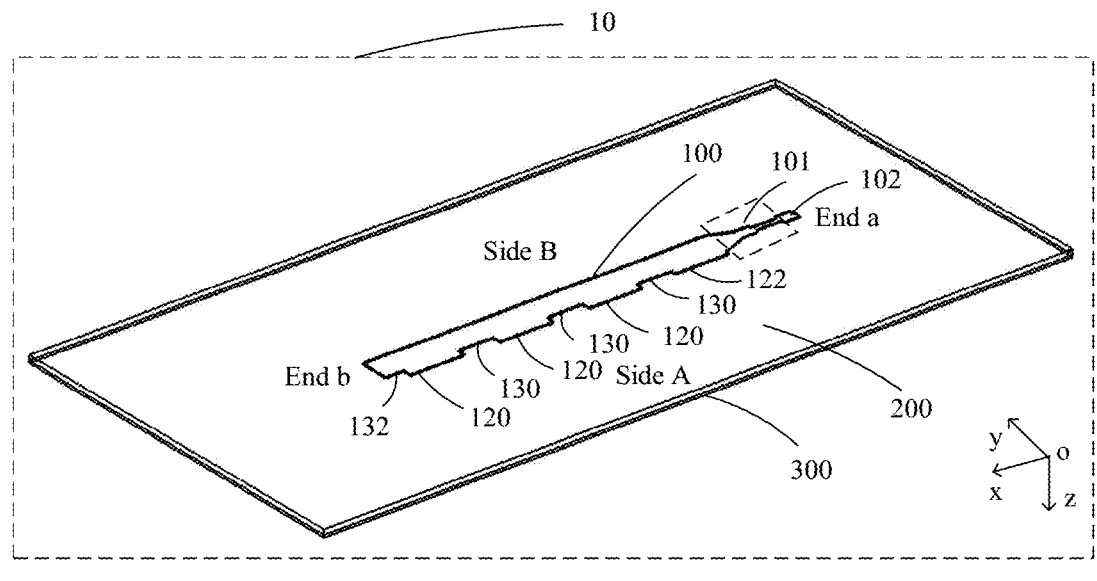
FIG. 10A is a schematic diagram of a structure of an antenna according to an embodiment of this application.

To better understand the broadband antenna provided in this application, the following provides descriptions with reference to the antenna 10 shown in FIG. 10A. Optionally, the antenna shown in FIG. 10A includes a microstrip radiation structure 100, a dielectric substrate 200, and a metal floor 300. The antenna is a PCB antenna. The microstrip radiation structure 100 includes a feed port 102, an impedance matching structure 101, first radiating elements, and second radiating elements and, in an example, includes three first radiating elements 120, one first radiating element 122, three second radiating element s 130, and one second radiation structure 132. The antenna 10 may be fed by using the feed port 102 at the end a.

Figure 10B:
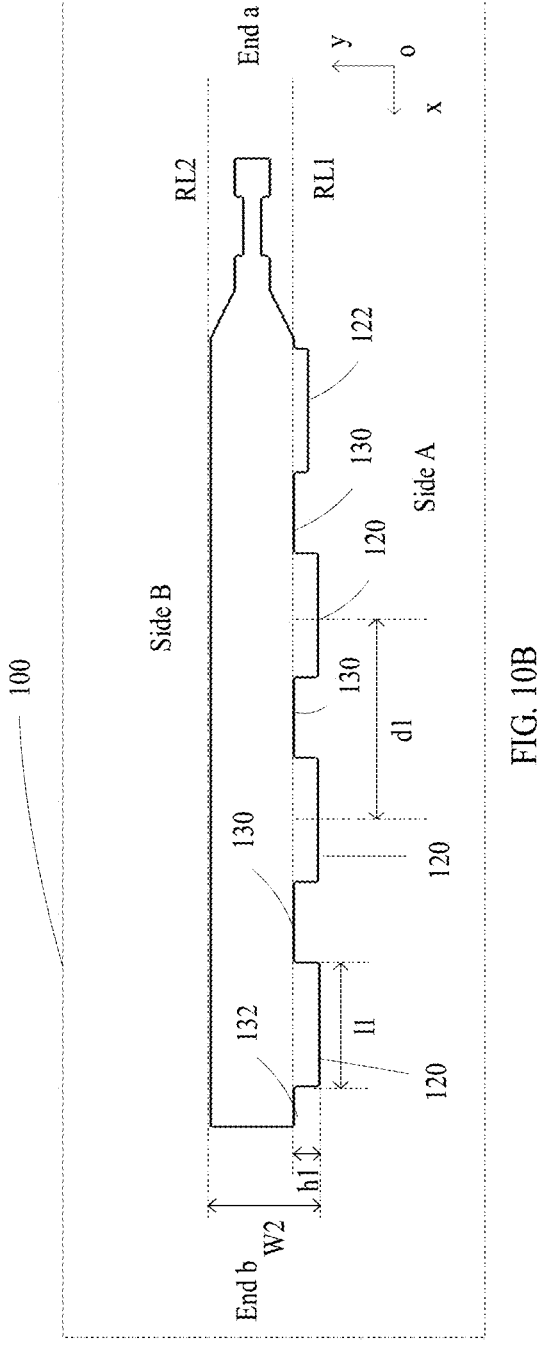
FIG. 10B is a schematic diagram of a microstrip radiation structure of the antenna shown in FIG. 10A.

Values of structure parameters of the microstrip radiation structure 100 are described with reference to FIG. 10B. A reference line RL1 is a straight line that passes through a deepest point of a concave part of the second radiating element and that is parallel to an x-axis, and a reference line RL2 is a straight line that passes through a side edge of a side B of the microstrip radiation structure 100. Optionally, a length l1 of the first radiating element is greater than or equal to 0.5 times a center operating wavelength of the antenna, and is less than or equal to 1.5 times the center operating wavelength of the antenna. In addition, a distance d1 between centers of the two adjacent first radiating elements in an x direction is less than or equal to 1.5 times the center operating wavelength of the antenna. A length l2 of the second radiating element is the distance d1 between centers of two adjacent first radiating elements minus the length l1 of the first radiating element 120. A width W2 of the microstrip radiation structure 100 shown in FIG. 10B is less than or equal to 0.5 times the center operating wavelength of the antenna, and is greater than or equal to 0.25 times the center operating wavelength of the antenna. A width h1 of the first radiating element in a y direction is greater than or equal to 0.02 times the center operating wavelength of the antenna, and is less than or equal to 0.5 times the center operating wavelength of the antenna. Optionally, when there are first radiating elements on two sides of the microstrip radiation structure 100, the width W2 of the microstrip radiation structure 100 may be less than or equal to 0.75 times the center operating wavelength of the antenna. Refer to the reference line RL1 shown in FIG. 10B. A width h2 of the second radiating element is equal to 0.

Figure 10C:
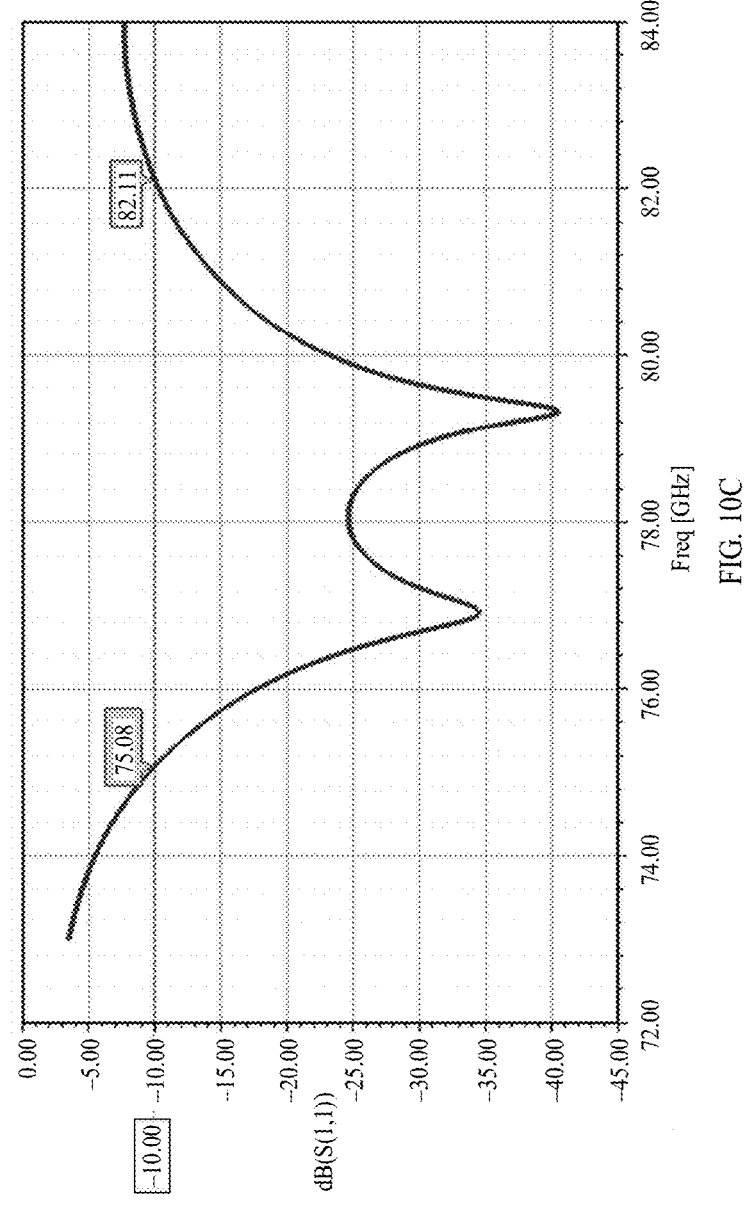
FIG. 10C is a simulation effect diagram of the antenna shown in FIG. 10A.

FIG. 10C shows a simulation effect of the antenna 10. An electrical parameter S11 (a vertical coordinate in FIG. 10C) of the antenna changes with a frequency (a horizontal coordinate in FIG. 10C). The electrical parameter S11 is a reflection coefficient of the feed port 102. It can be learned that the first radiating element 120 may resonate around 77 GHz (a first wave trough of a curve shown in FIG. 10C), and the second radiating element 130 or the second radiating element 132 may resonate around 79.4 GHz (a second wave trough of the curve shown in FIG. 10C). In this case, a frequency of S11≤10 dB may range from 75.08 GHz to 82.11 GHz, and an operating bandwidth of the antenna 10 is as high as 7.03 GHZ, to implement the broadband antenna.

It can be learned from the antenna 10 provided in this embodiment of this application that a convex structure and a concave structure are formed on a side of a wide microstrip line. According to this design, the convex structure may resonate at a first frequency, and the concave structure may resonate at a second frequency. When the antenna 10 operates, cavity-like field distribution is implemented, and then an effect of the broadband antenna is implemented.

Figure 11:
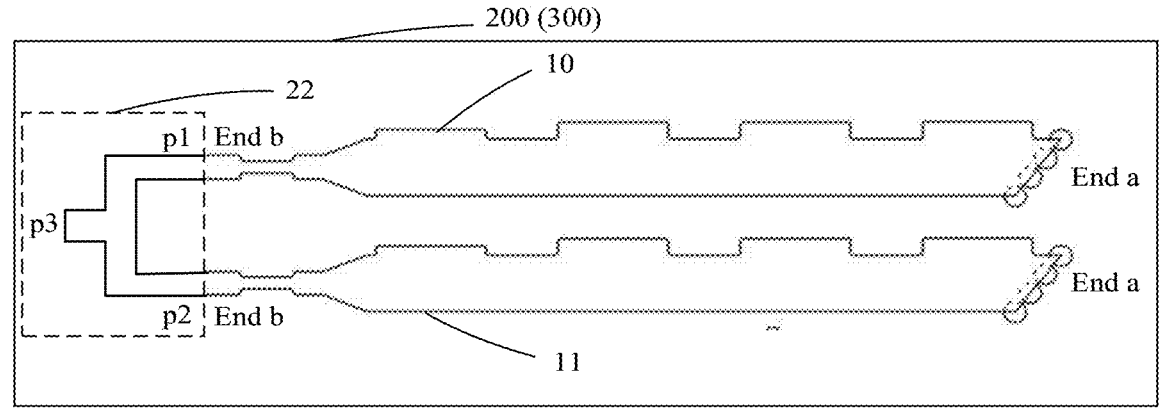
FIG. 11 is a schematic diagram of a structure of an antenna array according to an embodiment of this application.

This application further provides an antenna array. The antenna array may include the antenna in any one of the foregoing embodiments. Optionally, the antenna array may further include a power splitting and combining structure. FIG. 11 is a schematic diagram of a structure of an antenna array 20 according to an embodiment of this application. The antenna array 20 includes an antenna 10, an antenna 11, and a power splitting and combining structure 22. The power splitting and combining structure 22 includes a first power splitting end p1, a second power splitting end p2, and a combining end p3. An end b of the antenna 10 is electrically connected to the first power splitting end p1 of the power splitting and combining structure 22, and an end b of the antenna 11 is electrically connected to the second power splitting end p2 of the power splitting and combining structure 22. Therefore, a signal received on the antenna 10 and a signal received on the antenna 11 can be combined to the combining end p3. Alternatively, a signal transmitted by the combining end p3 may be split to the antenna 10 and the antenna 11. Therefore, a feed network can feed the antenna array 20 in a one-drive-two manner.

The power splitting and combining structure 22 shown in FIG. 11 is a one-to-two or two-in-one power splitting and combining structure. Optionally, the power splitting and combining structure 22 may alternatively be a one-to-multiple or multiple-in-one power splitting and combining structure, so that the feed network feeds the antenna array in a one-drive-multiple or a multiple-in-one manner.

As shown in FIG. 11, the antenna 10 and the antenna 11 may share the same dielectric substrate 200 and the same metal floor 300. Optionally, the dielectric substrate or the metal floor of the antenna 10 and the antenna 11 may be separately designed. This is not limited in this application. Optionally, the antenna 10, the antenna 11, and the power splitting and combining structure 22 may be separately designed and then electrically connected, or may be integrally formed directly.

Optionally, the antenna array 20 further includes a radome and/or the feed network.

This application further provides a detection apparatus, including the antenna provided in any one of the foregoing embodiments, and/or including the antenna array provided in any one of the foregoing embodiments. For example, the detection apparatus may be a radar. When the antenna or the antenna array provided in this application is used in the radar, range resolution of the radar can be improved. Optionally, the radar may be a vehicle-mounted radar.

This application further provides a terminal, including the antenna in any one of the foregoing embodiments, the antenna array provided in any one of the foregoing embodiments, and/or the detection apparatus provided in the foregoing embodiment. Optionally, the terminal may be a vehicle. When the detection apparatus is a radar, the radar in this application is installed in the vehicle, and a sensing capability of the vehicle can be improved by improving range resolution of the detection apparatus. Optionally, the vehicle in this application may be an autonomous driving vehicle, or a vehicle integrated with an ADAS. The vehicle in this application may be replaced with another vehicle or means of transportation such as a train, an aircraft, a robot, a slow transport vehicle, or a mobile platform.

The terminal in this application may alternatively be user equipment, an access terminal, a subscriber unit, a subscriber station, a mobile station, a remote station, a remote terminal, a mobile device, a user terminal, a terminal device, a wireless communication device, a user agent, or a user apparatus. The terminal may alternatively be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, another vehicle-mounted device, a wearable device, or a smart home device. This is not limited in this embodiment of this application. When the antenna or the antenna array provided in this application is used in another terminal device such as a mobile phone, bandwidth of an operating frequency band of the mobile phone may be provided.

The foregoing descriptions are embodiments of this application, and are not intended to limit the protection scope of this application. Any variation or replacement, for example, reducing or adding a mechanical part, and changing a shape of a mechanical part, readily figured out by a person skilled in the art within the technical scope disclosed in this application shall fall within the protection scope of this application. When no conflict occurs, embodiments of this application and features in embodiments may be mutually combined. Therefore, the protection scope of this application shall be subject to the protection scope of the claims.

What is claimed is:

1. An antenna, comprising:
   a dielectric substrate comprising a first side and a second side;
   a metal floor disposed on the first side; and
   a microstrip radiation structure disposed on the second side, having a first length in a direction that is less than or equal to 0.7 times a center operating wavelength of the antenna, and comprising:

a first radiating element formed by a convex structure on the microstrip radiation structure, wherein the first radiating element supports a first frequency band, wherein a second length of the first radiating element in the direction is greater than or equal to 0.02 times the center operating wavelength; and
   a second radiating element formed by a concave structure on the microstrip radiation structure, wherein the second radiating element supports a second frequency band.

2. The antenna of claim 1, wherein the microstrip radiation structure comprises one or more of a plurality of first radiating elements and a plurality of second radiating elements.

3. The antenna of claim 2, wherein the microstrip radiation structure further comprises adjacent radiating elements, and wherein a third radiating element is between at least one group of two adjacent radiating elements.

4. The antenna of claim 3, wherein a first distance between centers of a first group of two groups of adjacent radiating elements in a first direction is greater than or equal to 0.65 times a center operating wavelength of the antenna.

5. The antenna of claim 2, wherein the first radiating elements further comprises two groups of adjacent radiating elements, wherein a first distance between centers of a first group of the two groups of adjacent radiating elements is equal or unequal to a second distance between centers of a second group of the two groups of adjacent radiating elements.

6. The antenna of claim 2, wherein the second radiating elements further comprises two groups of adjacent radiating elements, wherein a first distance between centers of a first group of the two groups of adjacent radiating elements is equal or unequal to a second distance between centers of a second group of the two groups of adjacent radiating elements.

7. The antenna of claim 2, wherein the first radiating elements are disposed on a same side of the microstrip radiation structure.

8. The antenna of claim 2, wherein the second radiating elements are all disposed on a same side of the microstrip radiation structure.

9. The antenna of claim 2, wherein any two of the first radiating elements have a same first shape;
   wherein any two of the second radiating elements have a same second shape; or
   wherein more than two of the first radiating elements have a same third shape.

10. The antenna of claim 1, wherein a shape of the first radiating element or the second radiating element is a quadrilateral.

11. The antenna of claim 1, wherein the microstrip radiation structure further comprises:
   a first end; and
   an impedance matching structure disposed at the first end, and
   wherein the impedance matching structure is configured to match an impedance of the antenna.

12. The antenna of claim 11, wherein the impedance matching structure is a multi-stage impedance matching structure.

13. The antenna of claim 11, wherein the microstrip radiation structure further comprises a second end, and wherein the second end is an open circuit or a short circuit.

14. The antenna of claim 1, wherein a feeding manner of the antenna may be end feeding.

15. The antenna of claim 1, wherein a length of the first radiating element in a first direction is greater than or equal to 0.5 times a center operating wavelength of the antenna.

16. A vehicle, comprising:

a sensor system configured to sense an obstacle and comprising an antenna, wherein the antenna comprises:

a dielectric substrate comprising a first side and a second side;

a metal floor disposed on the first side; and a microstrip radiation structure disposed on the second side, having a first length in a direction that is less than or equal to 0.7 times a center operating wavelength of the antenna, and comprising:

a first radiating element formed by a convex structure on the microstrip radiation structure, wherein the first radiating element supports a first frequency band, wherein a second length of the first radiating element in the direction is greater than or equal to 0.02 times the center operating wavelength; and a second radiating element formed by a concave structure on the microstrip radiation structure, wherein the second radiating element supports a second frequency band; and a processor coupled to the antenna and configured to receive input from the sensor system to control motion of the vehicle based on input from the sensor system.

17. The vehicle of claim 16, wherein the microstrip radiation structure comprises one or more of a plurality of first radiating elements and a plurality of second radiating elements.

18. The vehicle of claim 17, wherein the microstrip radiation structure further comprises adjacent radiating elements, and wherein a third radiating element is between at least one group of two adjacent radiating elements.

19. The vehicle of claim 17, wherein the first radiating elements further comprises two groups of adjacent radiating elements, wherein a first distance between centers of a first group of the two groups of adjacent radiating elements is equal or unequal to a second distance between centers of a second group of the two groups of adjacent radiating elements.

20. The vehicle of claim 17, wherein the second radiating elements further comprises two groups of adjacent radiating elements, wherein a first distance between centers of a first group of the two groups of adjacent radiating elements is equal or unequal to a second distance between centers of a second group of the two groups of adjacent radiating elements.

* * * * *